(12) United States Patent
Cavallini

(10) Patent No.: US 6,404,159 B1
(45) Date of Patent: Jun. 11, 2002

(54) AUTOMATIC CART FOR TRANSPORTING GOLF CLUBS OR OTHER OBJECTS AND ACCESSORIES

(76) Inventor: Francesco Cavallini, Via Carducci 61, I-56038 Ponsacco-(PISA) (IT)

( * ) Notice: Subject to any disclaimer, the term of this patent is extended or adjusted under 35 U.S.C. 154(b) by 0 days.

(21) Appl. No.: 09/601,191

(22) PCT Filed: Jan. 27, 1999

(86) PCT No.: PCT/EP99/00572
§ 371 (c)(1),
(2), (4) Date: Jul. 28, 2000

(87) PCT Pub. No.: WO99/38722
PCT Pub. Date: Aug. 5, 1999

(30) Foreign Application Priority Data

Jan. 28, 1998 (IT) .......................................... PI98A0011
Nov. 30, 1998 (IT) .......................................... PI98A0078

(51) Int. Cl.[7] ............................. B64C 13/18; G05D 1/00
(52) U.S. Cl. ....................................... 318/587; 318/580
(58) Field of Search .................... 318/139, 580–582, 318/587, 590–591, 625

(56) References Cited

U.S. PATENT DOCUMENTS

| | | | | |
|---|---|---|---|---|
| 3,742,507 A | * | 6/1973 | Pirre ........................... | 318/587 |
| 3,748,564 A | * | 7/1973 | Ohba ........................... | 318/587 |
| 3,812,929 A | * | 5/1974 | Farque ......................... | 318/581 |
| 3,976,151 A | * | 8/1976 | Farque ......................... | 318/581 |
| 4,109,186 A | | 8/1978 | Farque | |
| 4,802,096 A | * | 1/1989 | Hainsworth et al. ......... | 318/587 |
| 5,155,684 A | * | 10/1992 | Burke et al. ................. | 318/587 |
| 5,350,982 A | | 9/1994 | Seib | |
| 5,363,933 A | | 11/1994 | Yu et al. | |
| 5,517,098 A | * | 5/1996 | Dong ........................... | 318/581 |
| 5,711,388 A | | 1/1998 | Davies et al. | |

FOREIGN PATENT DOCUMENTS

EP 0 694 432 A1 1/1996

* cited by examiner

Primary Examiner—Marlon T. Fletcher
(74) Attorney, Agent, or Firm—Smith, Gambrell & Russell, LLP

(57) ABSTRACT

An automatic cart for transporting golf clubs or other objects and accessories. The cart has at least one electric drive motor connected to at least one wheel of the cart, at least one electronic controller for controlling the motor, and a plurality of sensors peripherally disposed on the cart. The sensors are used to detect the presence of obstacles in the path of the cart and to sense the signals coming from an external signal source associated with the user. A microcomputer control unit analyses information from the sensors and coordinates movement of the cart so that it stays near the user.

22 Claims, 6 Drawing Sheets

AUTOMATIC CART FOR TRANSPORTING GOLF CLUBS OR OTHER OBJECTS AND ACCESSORIES

BACKGROUND OF THE INVENTION

This invention relates to an automatically driven cart particularly suitable for transporting golf clubs and other accessories on golf courses.

Carts for transporting golf clubs during the course of a game are, as well known, largely used on golf courses, thanks to the favorable economic aspect in respect of the electric vehicles transporting players and thanks, also, to the choice of the user for a more complete physical activity.

Most of said carts are provided with electric drive motors fed by on board batteries and are operated manually or by remote control devices using the steering and traction functions of the cart.

It has to be considered that the remote control operated cart does not produce tangible advantages for the person using it because, even if there is a reduction in the effort of carrying the clubs, there is still a necessary effort in concentrating on operating the remote control, which could result, in some cases, as stressful as carrying the golf bag. So, it has been searched, in the past, a solution to the problem of automatically transporting golf bags and clubs on the golf courses without requiring particular attention of the player and they have been proposed battery powered carts studied for following the user, however, never entered into practical use owing the sophisticated and expensive radio-controlled based techniques employed.

In particular, in U.S. Pat. No. 4,109,186 is shown all user following cart including a radio controlled guidance and speed control system in which spaced receivers are located on the vehicle for receiving magnetic energy signals from a signal source associated with the user.

In such a system the control of the vehicle involves some difficulties; in fact, it is based on the energy level differencies of the signals received by the receivers, and therefore, owing to the very small distances between the receivers, the above differencies are not suitable to be revealed and processed in a reliable way.

A more general and complete solution to the problem of serving the user on a golf course is shown in U.S. Pat. No. 5,711,388 that concerns a computerized, autonomous, robotic caddy capable of storing mapped areas and navigation rules an capable, also, of interacting with a global surveillance apparatus in order to serve the golfer around a golf course.

In this case, the cart is capable of decision making, emulating so a human caddy, and even more, it can give the user detailed informations about the environment of the play, but, it has to be noted that also in this case, when the cart interacts directly with the human user, the same problems of the former solution are encountered considering that, also in this case, the location of the golfer involves the directional sensing of radio signals transmitted from a beacon carried by the golfer itself.

So, in order to obtain an automatic transporting of golf bags and clubs with no or minimal attention required to the player, it urges, among others, to seek a solution to the problem of locating in a reliable way the player in respect of the cart by using techniques well fitting the dimensions of the cart and the distances involved in the process.

Furthermore, we need also to consider that golf carts are generally very essential because they are conceived to resolve in the most economical way the problem of transporting the clubs, without taking under consideration, for example, space to carry other accessories. Most of these carts, in fact, have a very simple structure, with a maximum of three wheels, one of which is almost always very small.

SUMMARY OF THE INVENTION

It is the primary object of the present invention to provide a cart with electrical propulsion for transporting golf clubs or other objects and accessories, with an innovative cost-effective guidance system completely automatic, in relation to the position of the player on the field, and having structural characteristics made to create high levels of reliability.

Another object of the invention is to provide a cart in which it will be possible to situate and protect golf clubs or bags and other accessories deemed useful in the development of the game and that furthermore, presents particular features of safety, handiness and transportability.

According to its broadest aspect, the present invention provides a cart for transporting golf clubs or other objects and accessories, wherein one or more electric drive motors are connected to one or more wheels of said cart, said motor or motors being fed by a battery installed on board, one or more electronic controllers are operated to control the motor or motors in both directions of movement a plurality of sensors, peripherally disposed on the cart, are used to detect the presence of obstacles in the path of the cart and to sense the signals coming from an external ultrasonic signal source positioned in view of said sensors and associated with the user, at least a microcomputer control unit, interfacing said sensors, is capable of driving said electronic controller or controllers according to an algorithm useful to lead said cart into the proximity of said external signal source.

In a preferred arrangement, the mechanical structure of the cart comprises two wheels aligned on a horizontal transversal axle located in correspondence of the advance section of the cart, said wheels being separately connected to the frame and to two respective traction motors, and one or more wheels, located in correspondence to the opposite section of the cart, connected to the frame by cylindrical hinge with vertical axle so that they can freely rotate around their own horizontal axle and also around said vertical axle passing in the proximity of the point of contact on the ground of said wheel or wheels.

In one particular embodiment, the mechanical structure of the cart comprises two wheels aligned on a horizontal transversal axle, located in correspondence of the advance section of the cart, connected to a steering mechanism controlled by an electric actuator, and one or more wheels, located in correspondence to the opposite section of the cart, connected to an electric traction motor. The microcomputer control unit is fitted, in this embodiment, to drive the controller of the traction motor as well as the aforementioned electric actuator of the steering mechanism.

It is to be noted that in this particular embodiment, an extra wheel, vertically movable through the help of a specific lever, allows the manual movement of the cart.

The cart of present invention comprises also a covering structure of the above mechanical and electrical components, including a container to house golf clubs directly or a place to situate one or more golf bags. In the second case, said bags are restrained, in a removable way, to two parallel shaped bars placed lengthwise in correspondence to each side of the cart, and a cover in rubberized material, or other, for protecting the aforementioned bags is connected to a little auxiliary frame hinged to said shaped bars in such a way that it can be moved from a first position in which said cover is folded inside said covering structure of the cart to a second position in which said cover is extended to protect said golf bags. Said shaped side bars have a useful conformation to be grabbed and to manually move the cart when required; furthermore, said side bars are connected to said covering structure through detachable junctions with the purpose of reducing the whole size of the cart when being transported.

In case that the covering structure comprises containers to accomodate clubs directly, said containers are inclinable in order to reduce even more the whole size of the cart during transportation.

Finally, the covering structure comprises side anti-collision protections and other housings, closed or opened, to host or keep accessories or other objects, and, further, may be equipped with removable securing means for restraining golf bags.

The advantages of the invention are mainly due to the innovative digital based completely automatic and reliable guidance system, that, prevents the player from having to manually drive the cart during his movements on the golf course, however allowing him to choose, when he deems it necessary, to drive the cart manually or by the remote control.

Also the advantages coming from the preferred lay-out, relative to the two front wheels separately connected to two respective electric motors, are clear, as already know those skilled in the art of electric vehicles, in consideration of the simplification of the number of mechanical components required, such as the differential gear and the steering, including its actuator.

From the simplification comes a noticeable limitation of the production time and, also, an increase in the global reliability of the cart.

Others and tangible advantages, concerning the fruition of the cart in the specific application field, come from the aforementioned covering structure.

DESCRIPTION OF THE DRAWINGS

Anyway, for a better understanding of the characterics and the advantages of the cart of present invention, this will now be described by way of examples with reference to the accompanying drawings, in which.

DETAILED DESCRIPTION OF THE INVENTION

Figure 1:
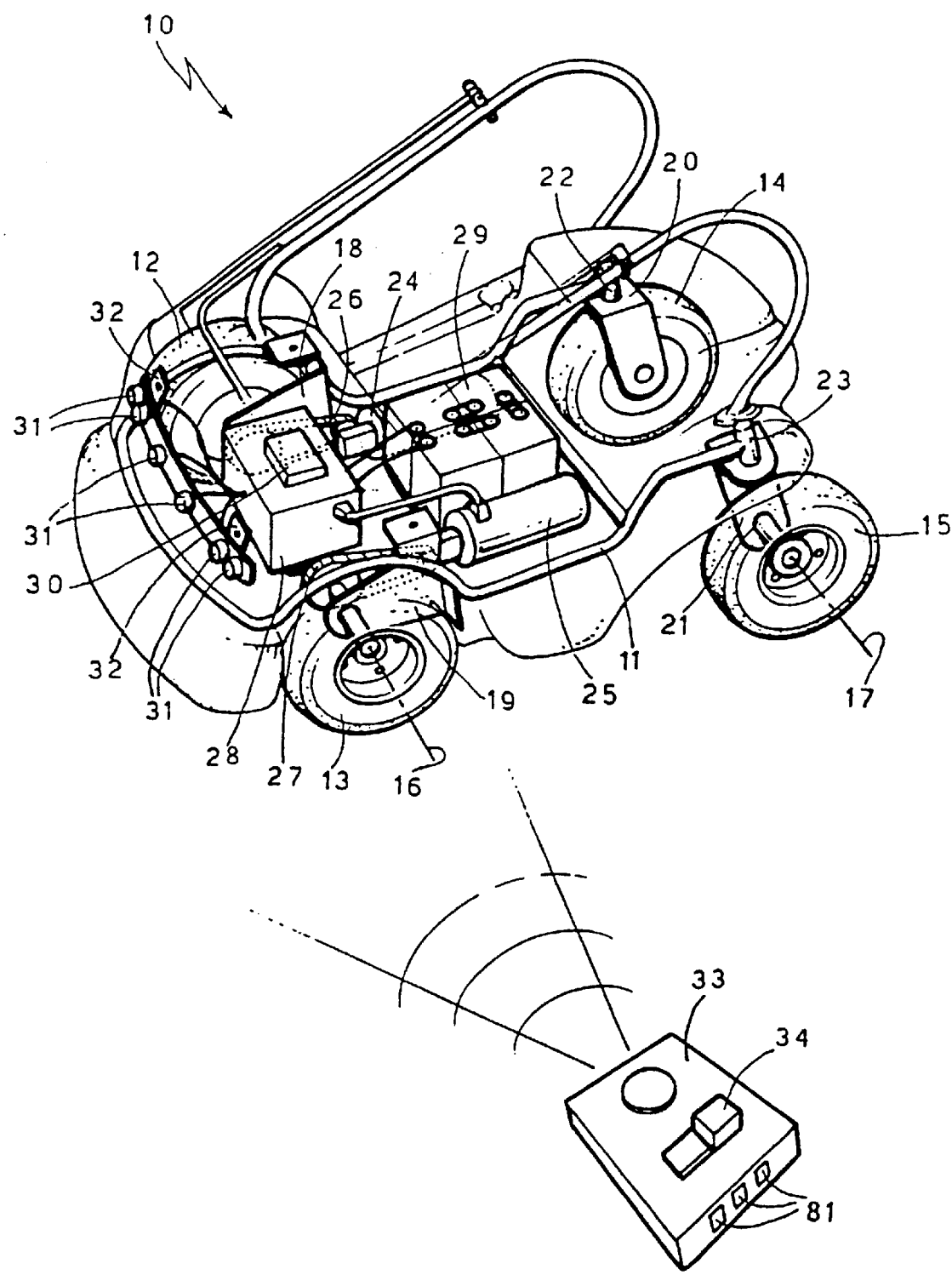
FIG. 1 shows a perspective view of the cart, in which a preferred lay-out of the main mechanical and electrical components of the cart is displayed.

Referring to the preferred embodiment of FIG. 1, it is indicated with "10" a cart schematically shown in a useful way so that its main components are well displayed.

The structural lay-out of the cart comprises, as we can see, a basic frame, 11, to which are linked two pairs of wheels, 12, 13 and 14, 15, placed in correspondence of two transversal axles, 16, 17, determined only geometrically and not physically because each one of said four wheels is separately linked to said frame 11.

In fact, the two wheels, 12, 13, placed in correspondence of the advance section of the cart, are supported by two respective shelves 18, 19, jointed to the frame 11, and also the wheels 14, 15, placed in correspondence to the opposite section of the cart, are separately linked to other two shelves, 20, 21.

It has also to be noted that the two front shelves 18, 19 are in a fixed position in respect to the frame 11, whereas the two back shelves 20, 21 are linked to the frame through cylindrical hinges with vertical axle, 22, 23. In this manner, the wheels 12, 13 can only rotate around the horizontal axle 16, whereas the wheels 14, 15 can freely rotate both around the horizontal axle, 17, and around the vertical axles fixed by said cylindrical hinges 22, 23; axles passing in proximity of the points of contact to the ground of the wheels 14, 15.

Said wheels, 12, 13, are moved by means of two respective motors 24, 25, connected to them through two separate belt transmissions 26, 27.

Said drive motors, 24, 25, are controlled through an electronic controller, 28, and are fed by a battery set, 29, that, in this example, consists of four batteries connected in series.

The battery set, 29, also feeds a microcomputer central unit, 30, that is interfacing with said controller, 28, and with sensors, 31, dedicated to the detection of any obstacle in the cart movement direction, and sensors, 32, dedicated to the sensing of an external signal source associated to the player.

Figure 11:
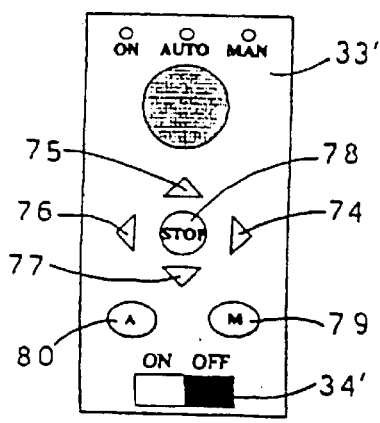
FIG. 11 shows schematically a front view of a remote control suitable for the cart of the invention.

In FIG. 1 we can just see a signal emitter, 33, being part of the control system of the cart of the invention. Said device, 33, is associated with the position of the user and is simply activated, through a switch, 34, to constitute a reference signal source in a pursuit automatic procedure, or to constitute just a remote control device, 33', as schematically shown in FIG. 11.

Figure 2:
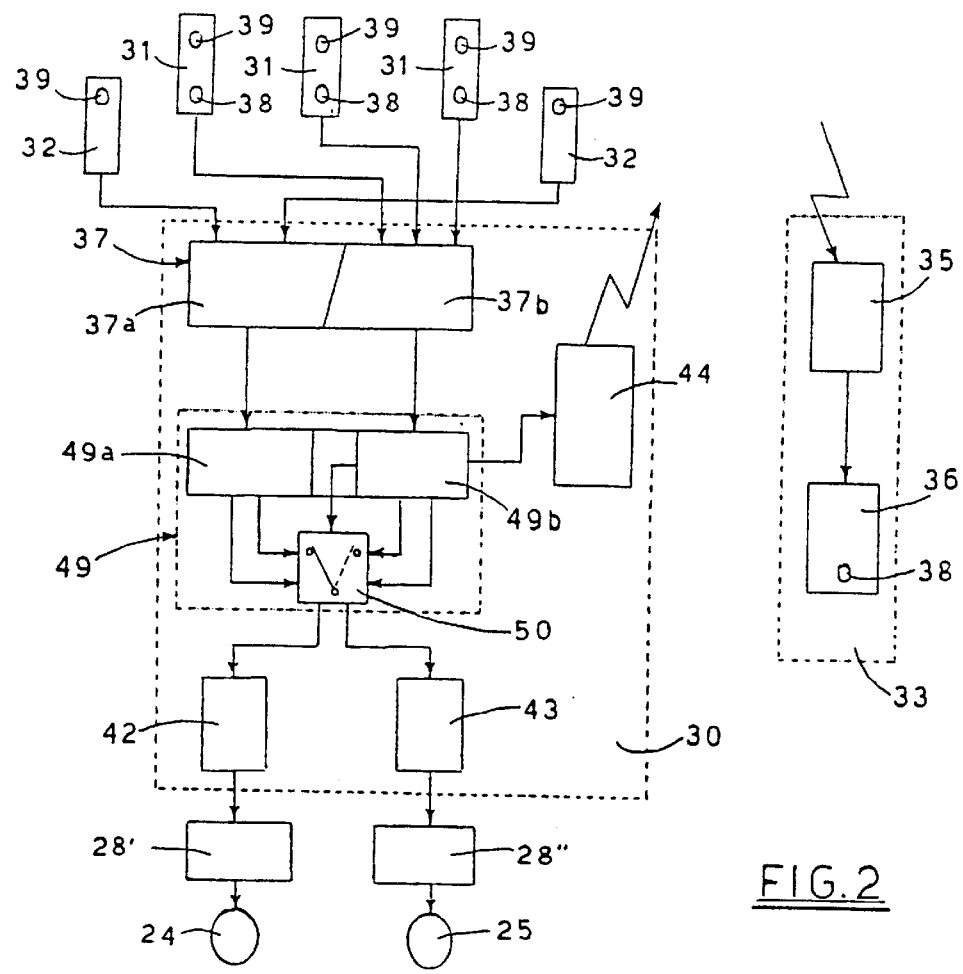
FIG. 2 shows a block diagram of the automatic guidance system of the cart shown in FIG. 1.

In case that said external device works as reference signal source, it comprises, as shown in the block diagram of FIG. 2, a receiving section, 35, of radio-frequency synchronizing signals and a transmitting section, 36, of signals compatible with said sensor units placed on board the cart; sensor units of ultrasound type, in this embodiment of the invention.

In the block diagram of FIG. 2 we find schematically represented also the other components of the control system, including a detailed subset of the central control unit, 30.

Said unit, 30, comprises, among others, a data acquisition section, 37, said section being subdivided in two subsections, 37a, 37b, dedicated respectively to the acquisition of first and second data, where, said first data are relative to the position of the external signal source, 33, in respect of the cart, and said second data are relative to the detection of any obstacle situated in the path of the cart.

In particular we can see that, in this embodiment, said first data are coming to subsection 37a from the two sensors, 32, dedicated to the sensing of the external source, whereas, said second data are coming to subsection 37b from the sensors, 31, dedicated to the obstacle detection.

It is to be noted that the sensors, 31, dedicated to the obstacles detection comprise one emitter, 38, and one receiver, 39, whereas, the sensors, 32, dedicated to the sensing of the external signal source or target, 39, comprise uniquely one receiver, 39. In fact, as the sensors 32 have simply to gather the signals emitted by the transmitting section, 36, of the external device, 33, the sensors 31 have also to provide for the emission of ultrasound signals, that, by reflecting on possible obstacles, come back towards said sensors and are gathered from these ones.

Figure 5:
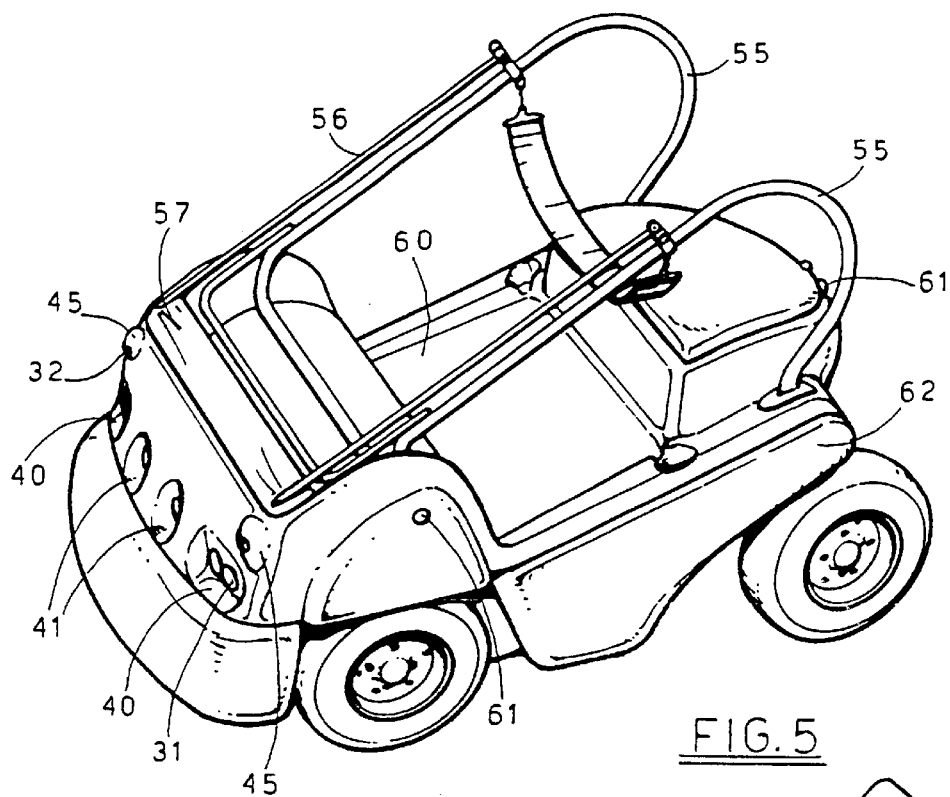
FIG. 5 shows a total view of the cart of FIG. 1, in a certain arrangement.

As we can see in FIG. 5, said pairs of elements, emitter and receiver, are placed close-by in lateral hollow portions, 40, of the front surface of the covering, 60; whereas they are placed separately in central hollow portions, 41, of the same surface.

The input data coming to section 37 pass to section 49 that is the real microcomputer central unit, wherein the proper operating algorithms of the control unit are implemented.

Figures 3, 4:
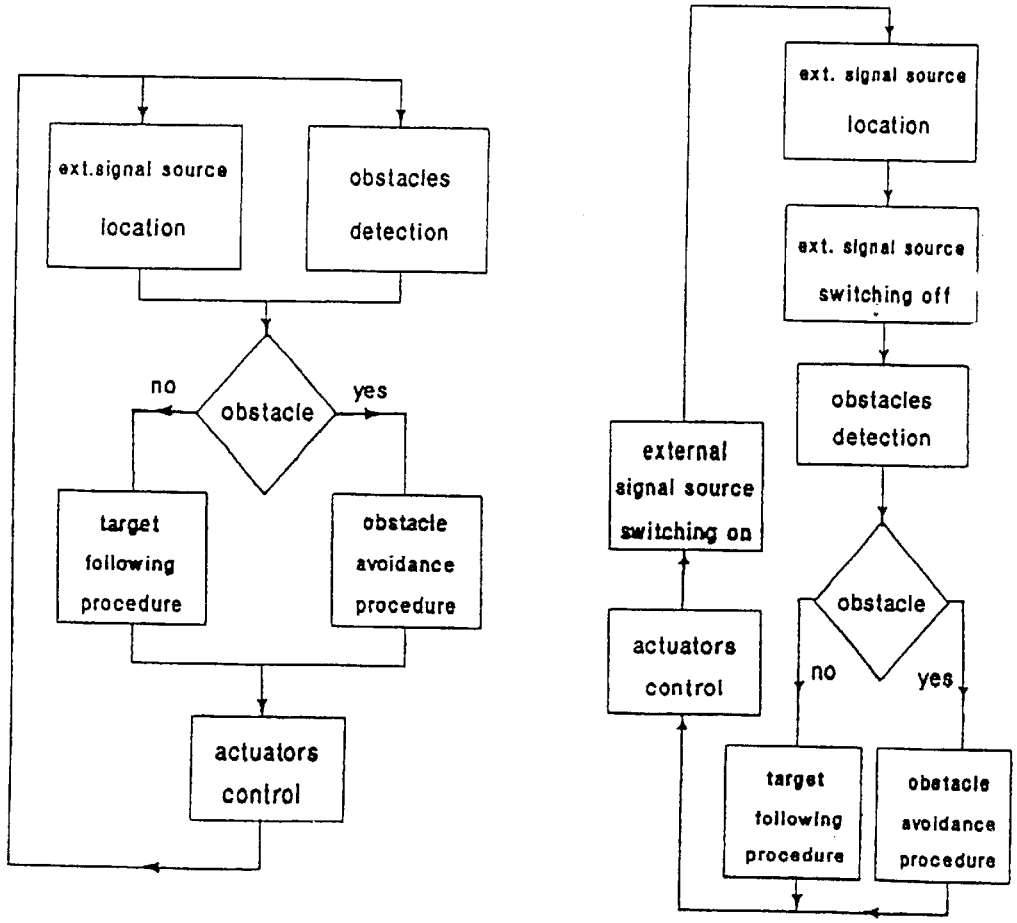
FIGS. 3 and 4 show logic flow diagrams pertaining the guidance system of FIG. 2.

Said section, 49, can include, as schematically shown in FIG. 2, two microprocessing units, 49a, 49b, operating in parallel, according to the flow diagram of FIG. 3, to accomplish the most effective control procedure in relation to the input data value or variation.

However, said section may also include only one microprocessing unit, sequentially working according to the flow diagram of FIG. 4.

Said microcomputer central unit 49 comprises a logic switching function, schematically indicated with 50, said logic switch being controlled in relation to the presence or not of obstacles on the path of the cart, in order to send to the actuators command sections 42, 43, the processed data useful to the target pursuit, or the processed data useful to avoid the detected obstacles.

Note that said sections 42 and 43 are respectively dedicated to the control of the two sections 28' and 28" of the electronic controller, 28, of the drive motors, 24 and 25.

The control central unit, 30, comprises also a transmitting section, 44, of radio-frequency synchronizing signals useful to control the working timing of the external ultrasound signal source, 33.

Figure 7:
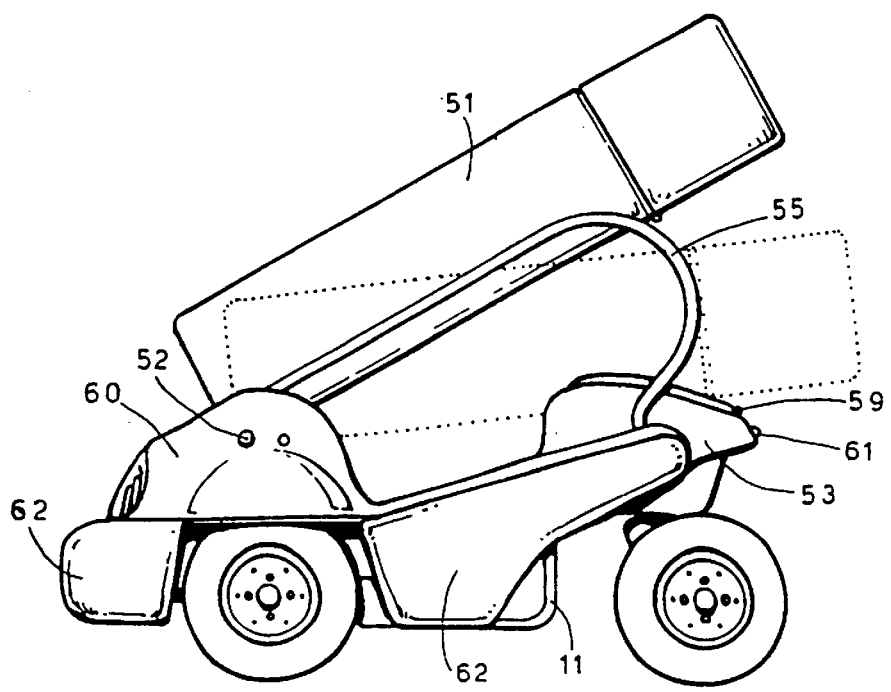
FIG. 7 shows a side view of an embodiment in accordance with the present invention.
Figure 6:
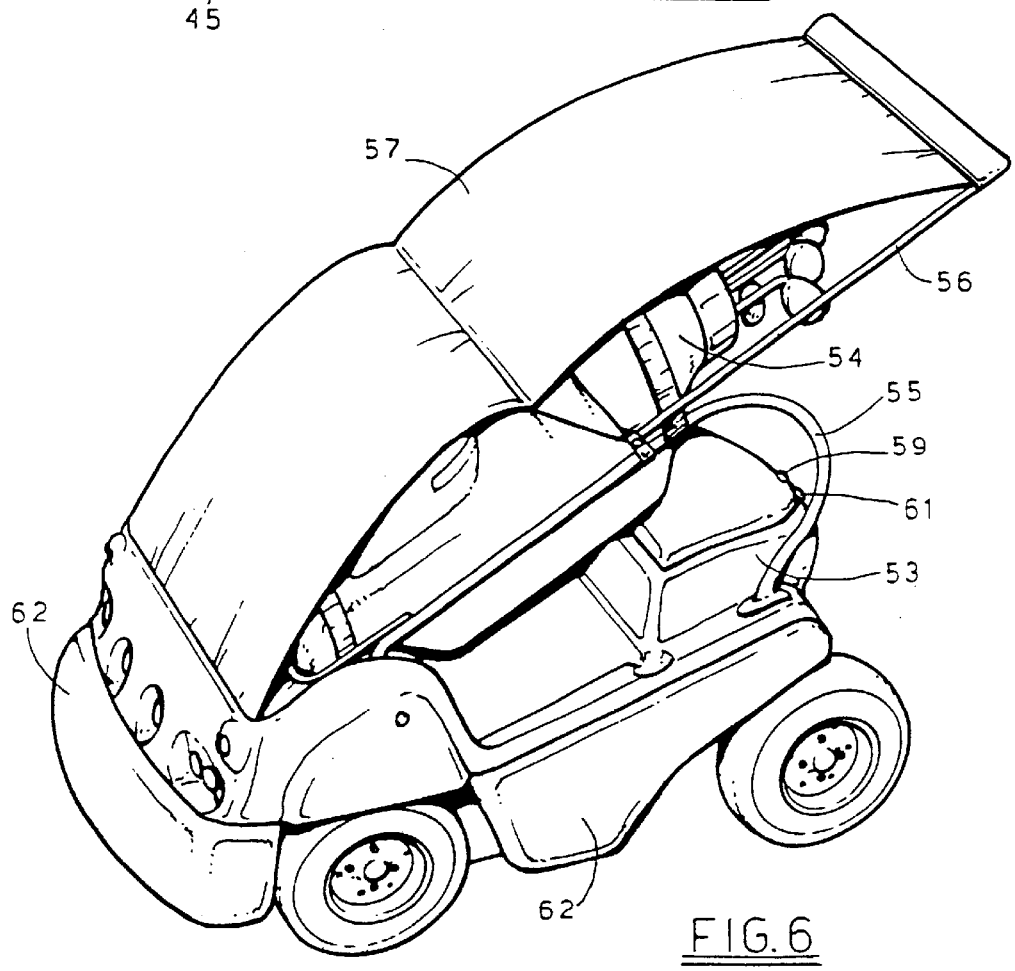
FIG. 6 shows another total view of the cart of FIG. 1, in a different operating configuration.

The covering, 60, of the aforementioned mechanical and electrical components is shown in FIG. 1, and, even better, in FIGS. 5, 6 and 7.

Said covering, made preferably of polymeric material, protects above and laterally the cart of the invention.

As we can see in FIGS. 5 and 6, the covering has some hollow portions, 40, 41, placed in its front surface, fitted to housing the sensors, 31, dedicated to the obstacle detection, and, furthermore, it has, still in its front surface, others housings for the sensors, 32, dedicated to the external signal source location.

The upper-part of said covering, 60, is mainly reserved to the holding of golf clubs, which can be directly put into containers that are part of the covering itself, as shown in FIG. 7, or, which can be inside golf bags restrained to the car; as shown in FIG. 6.

As regards the embodiment of FIG. 7, we can see that the container, 51, suitable for housing golf clubs, is a part of the upper structure, 60, of the cart, 10.

It, in particular, is hinged, through cylindrical hinges with horizontal axle, 52, to the aforementioned structure, 60, This allows putting the container, 51, in the position showed in dashed line in FIG. 7 just as it should be necessary reducing the volume of space occupied by the cart, in the storage phase or other. It is to be noted that in order to allow the container 51 to assume the above horizontal position, the back housing space, 53, is shaped such as to have a central hollow on the top, whose dimension is sufficient to partially host the container, 51.

About the embodiment of FIG. 6, we can notice, also with the help of FIG. 5, how the seating of the bag, 54, is simply obtained by utilizing two parallel shaped bars, 55, placed longitudinally in correspondence to the sides of the cart, said bars being shaped in such a way to be also valid points where to grab the cart to manually move it, when it is necessary.

Hinged to said shaped bars, 55, we see an auxiliary fame, 56, which movable extremities are binded to a cover, 57, in plastics or other, for protection of the golf bag, 54.

Said frame, 56, can rotate between the two positions shown in FIGS. 6 and 7, in correspondence of which, respectively, the sheet, 57, is rolled inside the covering structure, 60, or is completely extended over the bags containing the clubs.

The back housing space, 53, useful to shelter various accessories pertaining the sport activity done, is properly protected by the upper door, 58. This is useful in order to ensure a certain protection also against any undue removal of the shaped bars, 55, which, in effect, must be removed, but only if it is advisable to reduce the total volume of space occupied by the cart.

The presence of the door, 58, openable through the safety lock, 59, allows access to the inside point of attachment of the bars, 55, only when desired. Lights, 61, indicating the active operating condition of the cart, are placed peripherally on the covering 60. Further, we see, indicated with 62, bumpers in expanded material, laterally and frontally applied to the covering structure 60, As regards the embodiment of FIG. 8, we see that the cart has four wheels, of which the back ones, 14', 15', are connected to an electric drive motor, 63, through an usual differential gear, and the front ones, 12', 13', are connected to an electric actuator, 64, of a steering system of said wheels.

An electrical energy accumulator, 29', for feeding the traction system, the steering system and the control system is placed in correspondence to the back axle of the cart.

An electronic controller, 28', of the speed of the drive motor, 63, is placed in correspondence of the front axle of the cart, in proximity of a central control unit, 30', that is interfacing with sensor units, 65, 66, 67, located on the front of the cart, and with another sensor unit, 68, located, in this example, in correspondence of the left side of the cart.

The covering structure, 60', encloses the above components and comprises, also in this case, housing, 53', for various accessories.

Figure 8:
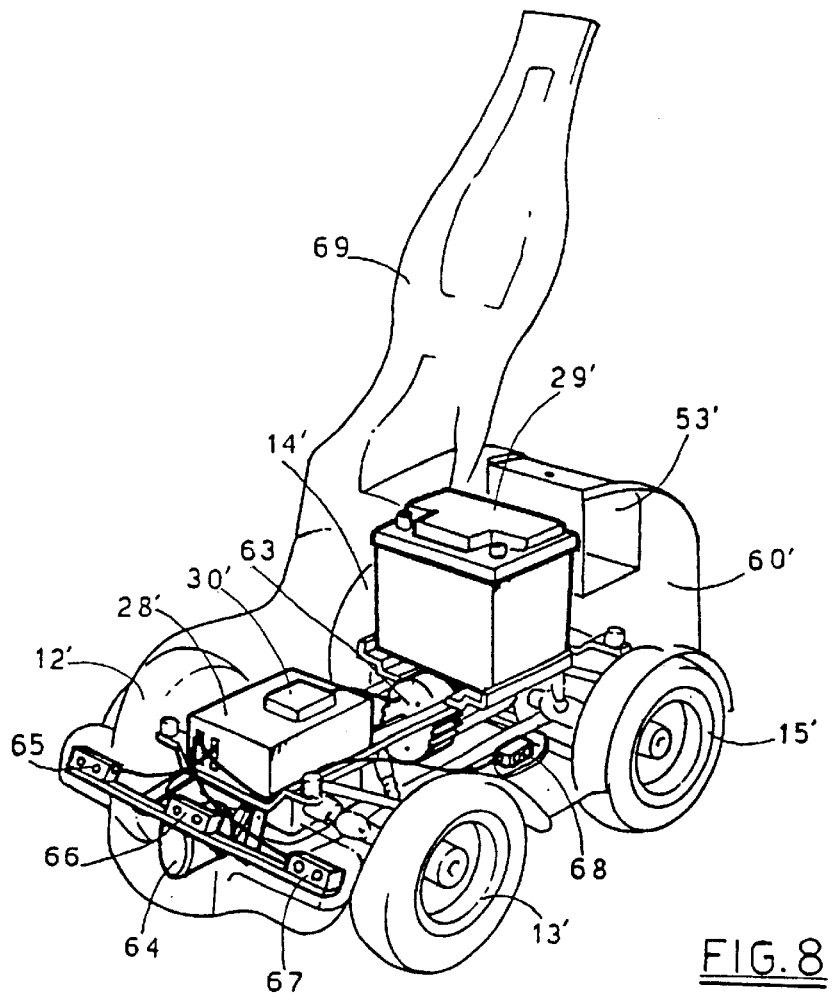
FIG. 8 shows a perspective view similar to the one of FIG. 1 but relative to another embodiment of the cart of the invention.
Figure 9:
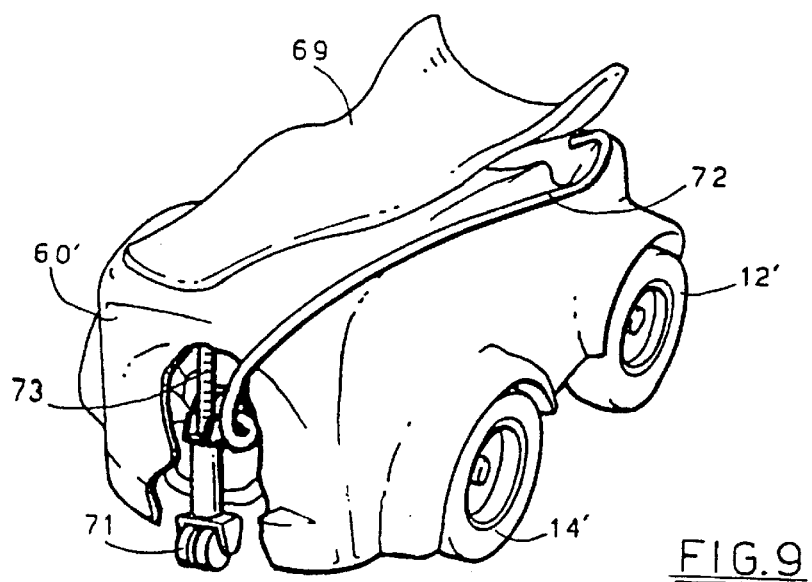
FIG. 9 shows a total view of the cart of FIG. 8.

To said covering, 60', is restrained a shaped support element, 69, for anchoring golf bags; said shaped element being removable from the position shown in FIG. 8, and placeable in different position; for instance, such as, the one shown in FIG. 9, in order to realize the more appropriate configurations in the using, or storing, of the cart.

Figure 10:
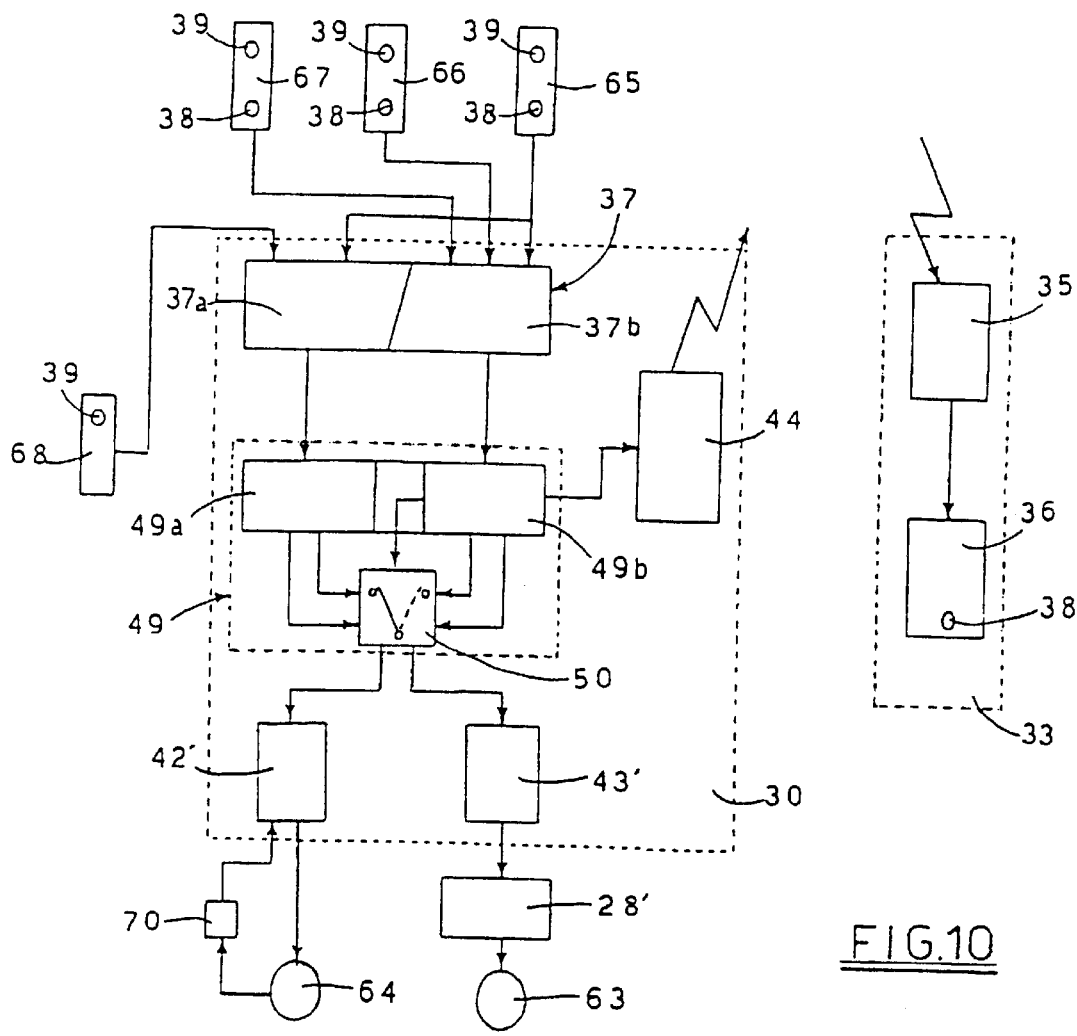
FIG. 10 shows a block diagram of the automatic guidance system of the cart shown in FIG. 8.

In FIG. 10 is shown the block diagram relative to this embodiment of the invention. As we can see, the control unit, 30, comprises the same internal sections, as shown in FIG. 2, pertaining to the data acquisition, the processing of the same data, the transmission of the synchronizing signals. and the driving of the external actuators; these ones, in this case, comprising only one drive motor, 63, and one steering system.

The steering system, in particular, comprises also a transducer, 70, for detecting the steering position, said transducer being essentially composed of a potentiometer suitable to interface the driving section, 42', of the steering system.

Regarding the section, 37, of data acquisition, we can notice that, in this embodiment, the data useful to the location of the external ultrasound signals source, 33, come to the subsection 33a through the sensor units, 65 and 68, placed respectively on the front side and on the left side of the cart, whereas, the data concerning the obstacles detection come to subsection 37b through the sensor units, 65, 66 and 67, placed along the front side of the cart.

It has also to be noted that, in this embodiment, the sensor unit 65 is both used for the obstacles detection and for the reference source location; in fact, these two phases can be distinguished one from the other, according to the flow diagram of FIG. 5, thanks to the transmission of well timed radio-frequency synchronizing signals by the transmitting section, 44, of the central control unit 30.

To complete the description of components of the cart shown in FIGS. 8 and 9, we see in this last drawing an auxiliary wheel, 71, vertically movable, through the rotation of a lever, 72, which can be grasped at one of its extremities, said lever being connected, at the other extremity, to a device which is engaged with a rack-bar, 73, to cause the movement of said wheel, 71, between two positions, lifted and lowered, respectively corresponding to the stand-by position of the lever, as shown in FIG. 9, and to the position of manual handling of the cart; position in which said lever is back inclined in respect of the cart.

In this second configuration, to the moving action toward the bottom of wheel 71 corresponds a lifting of the back wheels, 14', 15', of the cart, thus allowing an easy handling operation, The device, 33', besides the function of emitting the ultrasound signals, pertaining to the cart automatic driving operation, provides also to the working as a pure and simple remote control, with which it is possible to drive the cart from a distance through the central keys, 74 . . . 78, which control the cart traction and steering systems. Note that the passage from the automatic to the manual remote control operating and vice-versa is easily achieved by keys 79, 80.

The device 33, or 33', finally comprises, as we an see in FIG. 1, some electric contacts, 81, located on one of its lateral surfaces, in order to allow the charging of the device battery, when it is positioned in a specific housing of the covering structure, 60.

The cart of the invention operates as follows.

With the central control unit, 30, normally powered, the automatic driving of the cart is operating, or not, by simply putting in the proper positions the switch 34 of the external signal source, 33. This one may be in a fixed position or may be in movement with the player, but always it is oriented in a useful way so that the emitted ultrasound signals can reach directly the sensor units, 32, 65, 68, dedicated to receive said signals.

In case of a lack of reception of the ultrasound signals, the central control unit, 30, does not execute any data processing and, consequently, it does not send any command data to the actuators command sections, 42, 43, producing, so, the stopping of the cart.

At the moment that the above signals are received, it starts the data processing and, consequently, the actuators command parameters useful to lead the cart in proximity of the external source can be calculated in relation to which sensor unit, or units, has received the signal, and in relation to the measured time amount between the transmission moment, settled by the control unit through its section 44, and the receiving moment, established through the acquisition section 37. Note that, by said time amount, the distance between the external source and each sensor can be easily estimated, said time being directly proportional to said distance, and, therefore, also the external source location in respect of the cart is exactly estimated.

The above data processing takes place according to the flow diagram of FIG. 3 or 4, where, it can be seen that the operating cycle provides a continuous control of the obstacles presence, sequentially or in parallel to the external source location, having, in case of presence, an interruption in the movement of the cart, or, alternatively, an obstacle by-passing procedure, said procedure comprising, for example, a series of alternate cart movements in the two directions until the obstacle is laterally by-passed. Note that the exact location of the obstacles in respect of the cart is accomplished by using a time counting method similar to the aforementioned one used for the external source location, taking into account that, in this case, the distance is directly proportional to half the measured time; in fact, the ultrasound signals, emitted by the sensor, reflect on the obstacle and come back to the sensor itself.

By adopting the embodiment of FIG. 1, as those of ordinary skill in the art of electric vehicles readily recognize, the driving of motors 24, 25, can be related to the point where the reference external source is located. In fact, for example, we can have only the motor 24 in operation when the external source 33 is placed in such a position that it needs to move the cart towards left in order to lead it in proximity, or in direction, of said source. Obviously, only the motor 25 will be operated when the external signal source is placed on the right of the advancing direction of the cart.

In any case, it is to remark that, by adopting the preferred lay-out of the cart shown in FIG. 1, the central control unit, 30, sends the command parameters only to the drive motors, 24, 25, both to control the advancing in a straight line of the cart and to achieve the changes of direction, when required.

Thanks to the wheel 14, 15, freely rotating around the vertical axles passing in correspondence of the points of contact on the ground of the wheel themselves, it is also possible to easily move the cart manually in any, direction.

It is also to be noted that in case of obstacles, the use of device 33' can allow the easy passage to the remote control guidance for passing the obstacle and, then, going back to the automatic driving. Otherwise, the automatic operating cycle can be easily interrupted, by the switch 34', and, then, manually moving the cart.

Obviously, other procedures can be used to enhance the advantage obtainable by combining the phase of automatic guidance and the manual one.

In any case, the advantages of low cost and high reliability deriving from the employment of sensors suitable to the distance range involved and from the adoption of digitally based techniques are clearly evident as regards the automatic guidance system proposed.

It is also evident that various modifications to the described embodiments of the present invention will be envisaged without departure from the scope of the invention. For instance, in the embodiment of FIG. 1, it could be used, as already evident from the description, only one wheel freely rotating around the vertical axle passing through its own point of contact on the ground, or, could change the connection scheme of the electric drive motors to the respective wheels. In the embodiment of FIG. 8, for example, it may be a different number of drive motors, connected with one or more wheels of the cart. In another example, the covering structure may be any suitable shape, the golf clubs being housed in containers that are part of the structure itself, or being inside golf bags which can be binded to specific seats of said structure. In the first one of the above cases, it may be enhanced the undue removal proofing by using safety locks.

In yet another example, the covering of the cart may provide different housings, specifically made for particular accessories used in the golf game, or other accessories.

The sensors, finally, may be of any type, i.e. infrared one, suitable to the same or other specific ambient in which the cart may be employed.

These and other modifications may be carried out, always within the limits of the invention as defined in the appended claims.

What is claimed is:

1. Cart for transporting golf clubs or other objects and accessories, said cart comprising:
   one or more electric drive motors connected to one or more wheels of said cart and fed by an on board battery;
   one or more electronic controllers of said motor, or motors;
   a plurality of sensors positioned, peripherally, on said cart, including
      first sensor units dedicated to sense signals emitted by an external ultrasonic signal source associated with the user of the cart,
      second sensor units dedicated to detect the presence of obstacles in the path of the cart;
   one or more microcomputer control units interfacing said sensors and said controller, or controllers, according to an algorithm useful to lead said cart in the proximity of said external ultrasonic signal source;
   wherein said external ultrasonic signal source includes at least one ultrasonic signal emitter,
   wherein said first sensor units include at least one ultrasonic signal receiver,
   wherein said second sensor units include at least one ultrasonic signal emitter and at least one ultrasonic signal receiver.

2. Cart as claimed in claim 1, wherein second sensor units dedicated to the detection of obstacles in the path of the cart are composed of sensors positioned in correspondence with the front of the cart.

3. Cart as claimed in claim 1, wherein said first sensor units dedicated to sense the signal emitted by the external signal source comprise at least one sensor positioned in correspondence with one side of the cart and at least one sensor positioned in correspondence with the front of the cart.

4. Cart as claimed in claim 1, wherein a covering structure of the mechanical and electrical components of the cart comprises at least one container for golf clubs, said container being linked to said covering structure by means of horizontal cylindrical hinge so as to position said container either obliquely, during the normal use of the cart, or horizontally, during the transportation or storage of the cart.

5. Cart as claimed in claim 1, said cart comprising a covering structure of the mechanical and electrical components, in which there are specific housings for accessories and various objects, removable support elements being centrally connected to said covering structure for anchoring golf bags or similar objects.

6. Cart according to claim 1, wherein said microcomputer control unit, or units, includes at least one section dedicated to the transmission of radio-frequency signals for synchronising the operation of said external ultrasonic signal source in order to locate said signal source in respect of said cart by measuring the time amount between the synchronising signal transmission and the acquisition of said first data with the aid of said first sensor units.

7. Cart according to claim 1, wherein two wheels, aligned on a transversal horizontal axle located in correspondence with the advance section of said cart, are separately connected to the cart frame and to two respective electric motors, one or more wheels, located in correspondence with the opposite section of the cart, are connected to said frame by way of vertical axle hinges so as to allow it, or them, to rotate freely around both its, or their, own horizontal axle and the vertical axle passing in proximity of the point of wheel ground contact, said microcomputer control unit separately controls said electric motors so as to direct said cart towards said external ultrasonic signal source, the control action of the straight line advancement of the cart, as well as, of the necessary changes in direction, depending on which sensor unit, or units, has sensed the signals emitted by said external source.

8. Cart according to claim 1, wherein two wheels aligned on a transversal horizontal axle located in correspondence with the advance section of said cart, are connected to a steering system actuated by means of an electrical actuator, said steering system including a position transducer, one or more wheels, located in correspondence with the opposite section of the cart, are connected to an electrical traction motor, said microcomputer control unit, further including one section dedicated to controlling said steering system actuator, controls said electrical traction motor and said steering system actuator so as to direct said cart towards said external signal source, the control action of the straight line advancement of the cart, as well as, of the necessary changes in direction, depending on which sensor unit, or units, has sensed the signals emitted by said external source.

9. Cart according to claim 1, wherein said microcomputer control unit provides a reading phase of said first and said second data, a processing phase of said first data, a transmission phase of processed data to said control sections, said data processing and transmission phases depending on whether or not said second data reveal the presence of obstacles in the path of the cart, providing, in the event of the presence of obstacles, the transmission of data useful to stop the cart.

10. Cart according to claim 9, wherein said data processing section, in the event of the presence of obstacles, sends to said control sections processed data useful to stop the cart and to generate a series of alternate cart movements in two opposite directions until the obstacle is laterally by-passed.

11. Cart as claimed in claim 1, wherein said first sensor units dedicated to sense the signal emitted by the external signal source comprise at least one sensor positioned in correspondence with one side of the cart and at least one sensor positioned in correspondence with the front of the cart, and wherein at least one sensor of said first sensor units coincides with at least one sensor of said second sensor units, said microcomputer control unit transmitting signals for synchronising the operation of said external signal source in order to distinguish the signal source location phase from the obstacles detection phase.

12. Cart for transporting golf clubs or other objects and accessories, said cart comprising:
   one or more electric drive motors connected to one or more wheels of said cart and fed by an on board battery;

one or more electronic controllers of said motor, or motors;

a plurality of sensors positioned, peripherally, on said cart, including first sensor units dedicated to sense signals emitted by an external signal source, second sensor units dedicated to detect the presence of obstacles in the path of the cart;

one or more microcomputer control units interfacing said sensors and said controller, or controllers, according to an algorithm useful to lead said cart in the proximity of said external signal source;

said microcomputer control unit, or units includes at least one section dedicated to the acquisition of first and second data coming from said peripheral sensors, said first data being related to the location of said external signal source in respect of the cart, said second data being related to the detection of obstacles placed in the path of the cart, at least one section dedicated to interface said electronic controller, or controllers, at least one section dedicated to the processing of data coming from said acquisition section and to the sending of processed data to said control sections.

13. Cart as claimed in claim 12, wherein said microcomputer control unit, or units includes at least one section dedicated to the transmission of radio-frequency signals for synchronizing the operation of said external signal source in order to locate said signal source in respect of said cart by measuring the time amount between the synchronizing signal transmission and the acquisition of said first data with the aid of said first sensor units.

14. Cart as claimed in claim 12, wherein two wheels, aligned on a transversal horizontal axle located in correspondence with the advance of said cart, are separately connected to the cart frame and to two respective electric motors, one or more wheels, located in correspondence with the opposite section of the cart, are connected to said frame by way of vertical axle hinges so as to allow it, or them, to rotate freely around both its, or their, own horizontal axle and the vertical axle passing in proximity of the point of wheel ground contact, said microcomputer control unit separately controls said electric motors so as to direct said cart towards said external signal source, the control action, of the straight line advancement of the cart, as well as, of the necessary changes in direction, depending on which sensor unit, or nits, has sensed the signal emitted by said external source.

15. Cart as claimed in claim 12, wherein two wheels aligned on a transversal horizontal axle, located in correspondence with the advance section of said cart, are connected to a steering system actuated by means of an electrical actuator, said steering system including a position transducer, one or more wheels, located in correspondence with the opposite section of the cart, are connected to an electrical traction motor, said microcomputer control unit, further including one section dedicated to controlling said steering system actuator, controls said electrical traction motor and said steering system actuator so as to direct said cart towards said external signal source, the control action of the straight line advancement of the cart, as well as, of the necessary changes in direction, depending on which sensor unit or units has sensed the signal emitted by said external source.

16. Cart as claimed in claim 15, wherein a further wheel (17) is vertically movable between two positions, said wheel being located on the central longitudinal axle of the cart in correspondence with said wheels connected with said electric traction motor, in a first of said positions said wheel being raised from the ground, in a second of said positions said wheel being in contact with the ground and said two wheels being raised to allow the manual movement of the cart in emergency situations.

17. Cart as claimed in claim 12 wherein said microcomputer control unit provides a reading phase of said first and said second data, a processing phase of said first data, a transmission phase of processed data to said control sections said data processing and transmission phases depending on whether or not said second data reveal the presence of obstacles in the path of the cart, providing in the event of the presence of obstacles, the transmission of data useful to stop the cart.

18. Cart as claimed in claim 17, wherein said data processing section, in the event of the presence of obstacles, sends to said control sections processed data useful to stop the cart and to generate a series of alternate cart movements in two opposite directions until the obstacle is laterally by-passed.

19. Cart for transporting golf clubs or other objects and accessories, said cart comprising:

one or more electric drive motors connected to one or more wheels of said cart and fed by an on board battery;

one or more electronic controllers of said motor, or motors;

a plurality of sensors positioned, peripherally, on said cart, including first sensor units dedicated to sense signals emitted by an external signal source, second sensor units dedicated to detect the presence of obstacles in the path of the cart;

one or more microcomputer control units interfacing said sensors and said controller, or controllers, according to an algorithm useful to lead said cart in the proximity of said external signal source;

wherein at least one sensor of said first sensor units coincides with at least one sensor of said second sensor units, said microcomputer control unit transmitting signals for synchronizing the operation of said external signal source in order to distinguish the signal source location phase from the obstacles detection phase.

20. Cart for transporting golf clubs or other objects and accessories, said cart comprising:

one or more electric drive motors connected to one or more wheels of said cart and fed by an on board battery;

one or more electronic controllers of said motor, or motors;

a plurality of sensors positioned, peripherally, on said cart, including first sensor units dedicated to sense signals emitted by an external signal source, second sensor units dedicated to detect the presence of obstacles in the path of the cart;

one or more microcomputer control units interfacing said sensors and said controller, or controllers, according to an algorithm useful to lead said cart in the proximity of said external signal source;

wherein a covering structure of the mechanical and electrical components of the cart comprises a seating for housing one or more golf bags, said bags being restrained, in a removable way, to two parallel shaped bars positioned longitudinally in correspondence with the sides of the cart, a protection cover of said bags being bound to an auxiliary frame hinged at either end, to said shaped bars such that said protecting cover can be moved from a first position, whereby said cover is rolled up within said covering structure, to a second position whereby said cover is stretched out to protect said bags.

21. Cart as claimed in claim 20, wherein said shaped bars are connected to said covering structure by means of collapsible or removable attachments such that said bars can be removed or folded up during the transportation of the cart.

22. Cart for transporting golf clubs or other objects and accessories, said cart comprising:

one or more electric drive motors in driving communication with one or more wheels of said cart;

one or more electronic controllers for controlling one or more of said motors;

first and second sensor systems positioned on said cart;

wherein first said sensor system includes an external ultrasonic signal source associated with the user of the cart and said external ultrasonic signal source including at least one ultrasonic signal emitter, and said first sensor system includes a first sensor unit positioned on said cart and dedicated to sense signals emitted by said external ultrasonic signal source, and wherein said second sensor system includes second sensor units positioned on said cart and dedicated to detect the presence of obstacles in the path of the cart, and wherein said second sensor units include at least one ultrasonic signal emitter and at least one ultrasonic signal receiver; and one or more microcomputer control units interfacing said first and second sensor systems with said one or more electronic controllers to lead said cart in the proximity of said external ultrasonic signal source and to avoid obstacles.

\* \* \* \* \*